United States Patent
Kikuchi et al.

(10) Patent No.: US 6,490,636 B1
(45) Date of Patent: Dec. 3, 2002

(54) DATA PROCESSING SYSTEM FOR IMPROVED INPUT/OUTPUT COMMAND PROCESSING

(75) Inventors: Yoshihide Kikuchi, Tokyo (JP); Yuji Kaneko, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/330,168

(22) Filed: Jun. 11, 1999

(30) Foreign Application Priority Data

Jun. 12, 1998 (JP) .......................................... 10-165542

(51) Int. Cl.[7] ................................................. G06F 3/00
(52) U.S. Cl. ............................. 710/5; 710/20; 711/112; 711/156
(58) Field of Search ............................. 710/5, 6, 7, 20, 710/21; 711/112, 156

(56) References Cited

U.S. PATENT DOCUMENTS

| | | | | |
|---|---|---|---|---|
| 4,843,543 A | * | 6/1989 | Isobe | ........................ 711/148 |
| 5,617,347 A | * | 4/1997 | Lauritzen | ............... 365/189.07 |
| 6,000,019 A | * | 12/1999 | Dykstal et al. | ............. 711/104 |

FOREIGN PATENT DOCUMENTS

| | | | | |
|---|---|---|---|---|
| JP | 8-272688 | 10/1996 | | |
| JP | 9190293 | * 10/1996 | ............. G06F/3/06 |
| JP | 9-190293 | 7/1997 | | |

* cited by examiner

Primary Examiner—Matthew Kim
Assistant Examiner—Pierre M. Vital
(74) Attorney, Agent, or Firm—Foley & Lardner

(57) ABSTRACT

The present invention has as an object thereof to efficiently execute a plurality of I/O commands in a secondary storage device. The tags of the I/O commands which are issued from a data processing device to a secondary storage device comprise the tag A part and the tag B part. The same value is attached as the tag A part to a group of I/O commands which are to be executed in a continuous manner. Values of the tag B parts are provided in order to distinguish I/O commands having the same value of the tag A part. In the secondary storage device, when an I/O command is received from the data processing device, when it is shown by the tag B part that the I/O command is the first command in an I/O command group, or alternatively, when an I/O command having the same tag A part value is not stored in the queue, the I/O command received is added to the final end of the queue. On the other hand, when an I/O command having the same tag A part value is stored in the queue, the I/O command received is inserted after the I/O command group having the same tag A part.

15 Claims, 14 Drawing Sheets

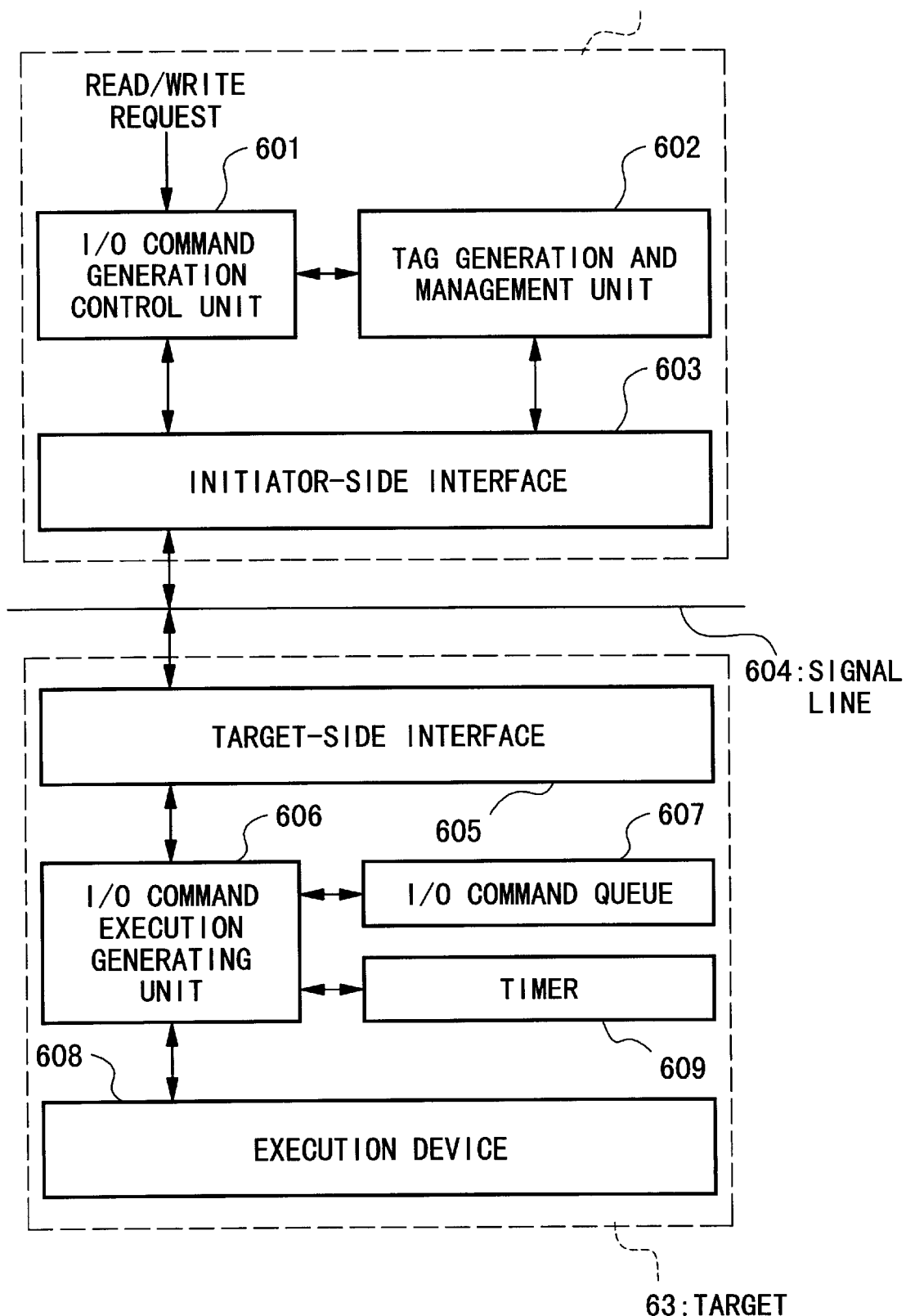

FIG.6

| | TAG A PART | TAG B PART | | | | | | |
|---|---|---|---|---|---|---|---|---|
| 209 | 0000 | 0000 | T_ID | I_ID | COMMAND CODE | ADDRESS | TRANSMISSION LENGTH | SURPLUS TIME | 201 / 217
| 210 | 0000 | 0001 | T_ID | I_ID | COMMAND CODE | ADDRESS | TRANSMISSION LENGTH | SURPLUS TIME | 202 / 218
| 211 | 0000 | 0010 | T_ID | I_ID | COMMAND CODE | ADDRESS | TRANSMISSION LENGTH | SURPLUS TIME | 203 / 219
| 212 | 0000 | 0011 | T_ID | I_ID | COMMAND CODE | ADDRESS | TRANSMISSION LENGTH | SURPLUS TIME | 204 / 220
| 213 | 0001 | 0000 | T_ID | I_ID | COMMAND CODE | ADDRESS | TRANSMISSION LENGTH | SURPLUS TIME | 205 / 221
| 214 | 0001 | 0001 | T_ID | I_ID | COMMAND CODE | ADDRESS | TRANSMISSION LENGTH | SURPLUS TIME | 206 / 222
| 215 | 0010 | 0000 | T_ID | I_ID | COMMAND CODE | ADDRESS | TRANSMISSION LENGTH | SURPLUS TIME | 207 / 223
| 216 | 0010 | 0010 | T_ID | I_ID | COMMAND CODE | ADDRESS | TRANSMISSION LENGTH | SURPLUS TIME | 208 / 224

FIG.14
(PRIOR ART)

| I_ID | TAG | DEADLINE SURPLUS TIME |
|------|-----|----------------------|
| 0001 | 00  | 1000 |
| 0001 | 01  | 1020 |
| 0001 | 02  | 1040 |
| 0002 | 00  | 1010 |
| 0002 | 01  | 1030 |
| 0002 | 02  | 1050 |

ORDER OF RECEPTION BY THE TARGET

SORTING BY DEADLINE SURPLUS TIME

| I_ID | TAG | DEADLINE SURPLUS TIME |
|------|-----|----------------------|
| 0001 | 00  | 1000 |
| 0002 | 00  | 1010 |
| 0001 | 01  | 1020 |
| 0002 | 01  | 1030 |
| 0001 | 02  | 1040 |
| 0002 | 02  | 1050 |

ORDER OF EXECUTION BY THE TARGET

DATA PROCESSING SYSTEM FOR IMPROVED INPUT/OUTPUT COMMAND PROCESSING

BACKGROUND OF THE INVENTION

1. Field of the Invention

The present invention relates to a data processing system, a device, a secondary storage device, and a recording medium storing a program, and in particular, relates to the scheduling of input and output commands issued in a secondary storage device from the data processing device.

This application is based on Japanese Patent Application No. Hei 10-165542, the contents of which are incorporated herein by reference.

2. Background Art Including Information Disclosed Under 37 CFR 1.97 and 1.98

Data exchange from an initiator comprising a host computer to a target comprising a secondary storage device is conducted by means of I/O (Input/Output) commands. There are I/O command execution methods in the initiator in which, after one I/O command has ended, the next I/O command is issued; however, for example, in the standard called SCSI (Small Computer System Interface)-2, prior to the completion of one I/O command, the next I/O command may be issued.

FIG. 9 shows the format of I/O commands in a first conventional example in the case in which a plurality of I/O commands are made simultaneously issuable. As shown in the figure, each of the I/O commands 801–808 incorporate a target number (T_ID), an initiator number (I_ID), a command code, an address, a transmission length, and in addition, tags 809–816, which serve to distinguish the I/O commands.

The tags 809–816 within the I/O commands 801–808 are attached in the initiator which issues the I/O commands by means of the method shown in the flowchart in FIG. 10.

When read/write requests are made by application programs on the initiator, then a determination is made in the initiator as to whether there are I/O commands which are to be simultaneously issued with respect to the same target (this indicates that the I/O commands are issued and the execution thereof is not yet completed) (step S701).

Here, when a determination has been made that there are I/O commands which are to be simultaneously issued, then the initiator attaches, to an I/O command which is to be issued in response to a read/write request, a tag having a number obtained by adding "1" to the value of the tag of the I/O command which was immediately previously issued with respect to the same target (step S702). On the other hand, when a determination has been made that there are no I/O commands which are to be simultaneously issued, a value of "0" is attached to the I/O command to be issued as a tag (step S703).

Then, when a tag is attached in this manner, the processing of the flowchart shown in FIG. 10 is ended, and the initiator creates and issues the I/O commands having the format shown in FIG. 9 in accordance with the tags attached. Here, when the reading and writing unit of the data in the target is 16 KB, when a 64 KB read request is made by the application program on the initiator, as shown in FIG. 11, in the device driver which issues the I/O commands, four 16 KB read I/O commands having the tags "00"–"03" attached thereto are issued.

Further, Japanese Patent Application, First Publication No. Hei 8-272688 discloses a cache memory device which simply stores hierarchical items and cache tags in a single cache array structure.

Furthermore, as a second conventional example, in the case in which a plurality of I/O commands are made simultaneously issuable, the technology disclosed in Japanese Patent Application, First Publication No. Hei 9-190293 is known. In this technology, attention is drawn to the fact that, among the I/O commands issued by the initiator, there are commands having a high degree of urgency and those having a low degree of urgency, and the initiator attaches to each I/O command a "surplus time" which functions as a time gap until the execution of the I/O command which is issued.

Next, in the target in which these I/O commands have been received, a "deadline surplus time (point in time)" obtained by adding the "surplus time" in the I/O command to the present point in time calculated by a timer within the target is calculated, and the I/O commands are issued in order from those having the earliest deadline surplus time.

However, in recent years, structures have been adopted in which the disk devices which serve as the targets of a number of initiators are held in common using interfaces such as Fibre Channels or the like. When such a structure is employed, in the first conventional example described above, even if a series of I/O commands (hereinbelow referred to as an I/O command group) are issued by a single initiator in order to read out a continuous region of a disk, the I/O commands which arrive from a plurality of initiators become confused in the target, and this creates a problem in that wasteful seek operations are generated.

In other words, as shown in FIG. 12, when three I/O commands (indicated in the figure by the cross-hatched rectangles, the white rectangles, and the black rectangles) arrive essentially simultaneously at a disk device 1004 which serves as a target from three hosts 1001–1003 which serve as initiators via interface 1005, the I/O commands which arrive are stored in a queue in a form in which the I/O commands arriving from hosts 1001–1003 are mixed up, as shown in the lower right of FIG. 12. In such a case, even if the I/O commands for accessing a continuous region of a disk are issued by hosts 1001–1003, the order of processing thereof in disk device 1004 becomes confused. For this reason, problems are present in that wasteful seek operations are generated, and the execution efficiency of the I/O commands becomes extremely poor.

In order to avoid such problems, the method shown in FIG. 13, termed "elevator seeking", is known. Here, when a head 1105 moving in the direction indicated by the arrow is above a region 1102 of disk 1101, and a series of I/O commands for accessing the continuous regions 1102, 1103, and 1104 arrive in response to a single read/write request in an application program, then the regions 1103, 1104, and 1102 on disk 1101 are accessed. Here, when regions 1103 or 1104 are accessed, if a command for accessing a region to the inside of region 1104 arrives, then this region is accessed first, and this is undesirable. Accordingly, a considerable amount of time is required until region 1102 is accessed, and the transmission of the completion of the read/write to the application program becomes significantly delayed.

Furthermore, in the second conventional example described above, even if the same "surplus time" is attached to each I/O command within an I/O command group in the initiator, "deadline surplus times" are attached in the target in accordance with the time at which each I/O command was actually received. For example, even if I/O command groups for accessing respective continuous regions are issued from initiators having the same initiator number, and these are received by the target in the order shown in the upper table of FIG. 14, when the "deadline surplus times" are attached as shown in the figure, the target executes the I/O commands in the order shown in the lower table of FIG. 14. For this reason, the order of access of the regions on the disk becomes confused, wasteful seek operations are generated, and the execution efficiency of the I/O commands becomes extremely poor.

SUMMARY OF THE INVENTION

The present invention was created in order to solve the problems present in the conventional technology described above, and has as an object thereof to provide a data processing system, a device, a secondary storage device, and a recording medium for recording programs which are capable of efficiently executing a plurality of input and output commands.

In order to attain the above object, a data processing system in accordance with a first view of the present invention is provided with a data processing device which issues input and output commands, and a secondary storage device which is connected to the data processing device via signal lines and which conducts data exchange with the data processing device in accordance with the input and output commands.

The data processing device is provided with: a first tag attachment device for attaching a first tag which is identical with respect to a series of input and output commands for accessing a continuous region of the secondary storage device, among the input and output commands to be issued in response to input and output requests from a host, and which differs from input and other output commands simultaneously executed, a second tag attachment device for attaching a second tag for identifying respective input and output commands to which the same first tag is attached by means of the first tag attachment device, an input and output command generating device for generating input and output commands having first and second tags attached thereto by the first and second tag attachment device, and an input and output command transmitting device for transmitting input and output commands generated by the input and output command generating device to the secondary storage device via the signal lines.

The secondary storage device is provided with: an input and output command receiving device for receiving input and output commands transmitted by the input and output command transmitting device, via the signal lines, an input and output command storage device for storing input and output commands received by the input and output command receiving device, an input and output command arrangement device for arranging input and output commands in accordance with the first and second tags attached to the input and output commands and storing these in the input and output command storage device, and an input and output command executing device for executing, in order, input and output commands arranged by the input and output command arrangement device and stored in the input and output command storage device.

In accordance with the data processing system described above, the tags added to the input and output commands are separated into first tags and second tags, and moreover, the same first tag is attached to a series of input and output commands corresponding to a single input and output request. Accordingly, in the secondary storage device, the input and output commands are arranged so that the commands having the same first tag are continuous, and furthermore, the series of input and output commands are arranged in order by means of the second tags, and thereby, it is possible for the input and output command execution device to efficiently execute the input and output commands.

In the data processing system described above, what is meant by input and output commands is not necessarily commands in which both input and output are present, so that for example, an input command from a read-only memory device would be included.

In order to attain the above object, in the data processing system described above, the data processing device may be further provided with a surplus time appending device for appending surplus time until the execution of the input and output command to each input and output command generated by the input and output command generating device. In such a case, the secondary storage device may be further provided with a timing device for timing points in time, and a deadline surplus time generating device for generating, based on surplus time appended to each input and output command received by the input and output command receiving device and points in time measured by the timing device, a deadline surplus time which serves as the execution deadline for each input and output command, by means of the input and output command executing device, and the input and output command arrangement device may furthermore be set to arrange the input and output commands in accordance with the deadline surplus time generated by the deadline surplus time generating device and to store these in the input and output command storage device.

By means of this, a series of input and output commands corresponding to a single input and output request can be efficiently executed in a continuous manner, and it is also possible to exercise deadline control in units of series of input and output commands.

In the data processing system above, a plurality of the data processing devices may exist. In such a case, the first tag attachment device of each data processing device attaches a first tag containing identification data for identifying the plurality of data processing devices.

In order to attain the above object, a data processing device in accordance with a second view of the present invention comprises a data processing device constructed so as to be connectable via signal lines with a secondary storage device and executing input and output commands in order in accordance with tags attached thereto, wherein are provided: a first tag attachment device for attaching a first tag which is identical with respect to a series of input and output commands for accessing a continuous region of the secondary storage device, among the input and output commands to be issued in response to input and output requests from a host, and which differs from input and other output commands simultaneously executed, a second tag attachment device for attaching a second tag for identifying respective input and output commands to which the same first tag is attached by means of the first tag attachment device, an input and output command generating device for generating input and output commands having first and second tags attached thereto by the first and second tag attachment device, and an input and output command transmitting device for transmitting input and output commands generated by the input and output command generating device to the secondary storage device via the signal lines.

In accordance with the data processing device described above, the tags attached to the input and output commands are separated into first tags and second tags, and moreover, the same first tag is attached to a series of input and output commands corresponding to a single input and output request. Accordingly, in the secondary storage device which is connected with the data processing device described above, by managing the input and output commands in accordance with the first and second tags attached by the data processing device described above, it is possible to efficiently execute the input and output commands.

In the data processing device described above, the first tag attachment device may be such as to attach a first tag containing identification data for identification with respect to other data processing devices.

In the data processing device described above, the second tag attachment device may be such as to attach a second tag having a value corresponding to the order of issue of the input and output commands by means of an input and output command issue device.

In order to attain the above object, a secondary storage device in accordance with a third view of the present invention is provided with: an input and output command receiving device for receiving input and output commands having attached thereto a first tag which is identical with respect to a series of input and output commands accessing a continuous region and which differ from other input and output commands simultaneously executed, and second tags for identification of input and output commands having identical first tags, an input and output command storage device for respective input and output commands received by the input and output command receiving device, an input and output command arrangement device for arranging the input and output commands in accordance with the first and second tags attached to the input and output commands, and storing these in the input and output command storage device, and an input and output command execution device for executing, in order, input and output commands arranged by the input and output command arrangement device and stored in the input and output command storage device.

In the secondary storage device described above, for example, by arranging the input and output commands so that the commands having the same first tag are continuous, and then by further arranging a series of input and output commands in order of the second tags, the input and output command execution device can efficiently execute the input and output commands.

In the secondary storage device described above, the input and output command arrangement device may be provided with a device for determining whether an input and output command having the same first tag as an input and output command received by the input and output command receiving device is stored in the input and output command storage device, and a device for storing the input and output command received by the input and output command receiving device together with input and output commands having the same first tag previously stored in the input and output command storage device, when a determination has been made that an input and output command having the same first tag is stored.

In the secondary storage device described above, for example, the second tags appended to the input and output commands may have values corresponding to an order of issue of the input and output commands by means of an input and output command issue device. In such a case, the input and output command arrangement device may be provided with: a device for determining whether the input and output command is the first among a series of input and output commands to which the same first input and output command is appended, in accordance with the second tags, and a device for, when the device described above determines that this is a first input and output command, storing the input and output command received by the input and output command receiving device at the final end of the input and output commands stored in the input and output command storage device.

In the secondary storage device described above, surplus time until input and output commands received by the input and output command receiving device are executed may be added to the input and output commands. In such a case, the secondary storage device may be further provided with a timing device for timing points in time, and a deadline surplus time generating device for generating, based on surplus time appended to each input and output command received by the input and output command receiving device and points in time measured by the timing device, a deadline surplus time which serves as the execution deadline for each input and output command, by means of the input and output command executing device, and the input and output command arrangement device furthermore may be such as to arrange the input and output commands in accordance with the deadline surplus time generated by the deadline surplus time generating device and to store these in the input and output command storage device.

In the case of such a structure, the deadline surplus time generating device may be provided with a device for determining whether an input and output command having the same first tag as each input and output command received by the input and output command receiving device is stored in the input and output command storage device, and a device for, when the device described above determines that an input and output command having the same tag is stored, generating a deadline surplus time having the same tag stored in the input and output command storage device, as the deadline surplus time of each input and output command.

By means of this, it is possible to efficiently and continuously execute a series of input and output commands corresponding to a single input and output request, and it is possible to conduct deadline control using as units series of input and output commands.

In order to attain the above object, a computer-readable recording medium in accordance with a fourth view of the present invention records a program which realizes: a first tag attachment step for attaching a first tag which differs from other simultaneously executed input and output commands and which is identical with respect to a series of input and output commands which access a continuous region of a secondary storage device and are input and output commands which are to be issued in response to input and output requests from a host, and a second tag attachment step for attaching a second tag for identifying respective Input and output commands to which the same first tag is attached in the first tag attachment step.

BRIEF DESCRIPTION OF THE DIAGRAMS

FIG. 5 is a block diagram showing the structure of a data processing system to which a second embodiment of the present invention has been applied.

FIG. 6 shows the format of the I/O commands generated by the I/O command generation control unit in a second embodiment of the present invention.

Figure 8:
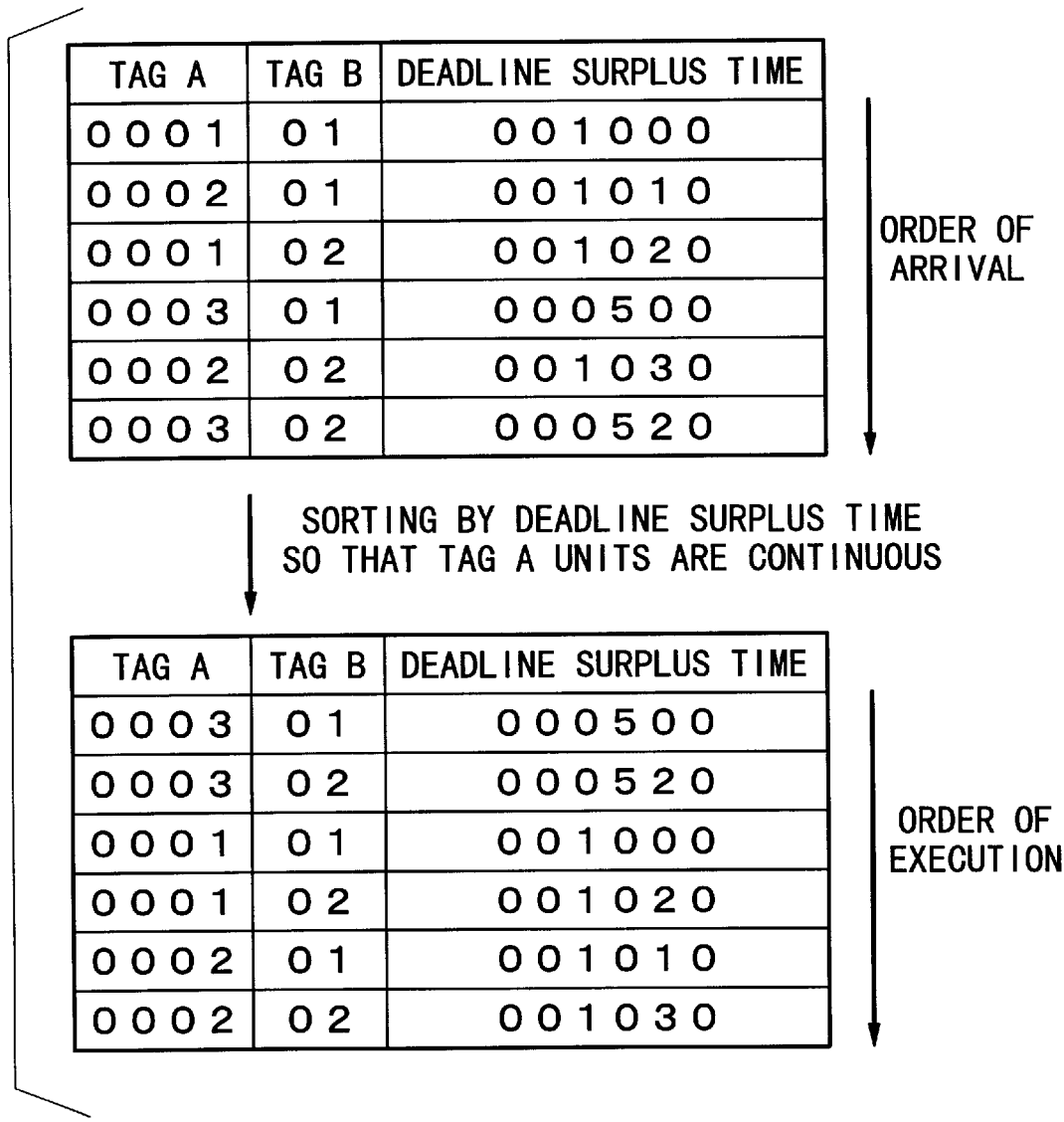

FIG. 8 serves to explain the reordering operation of the I/O commands in the second embodiment of the present invention.

Figure 9:
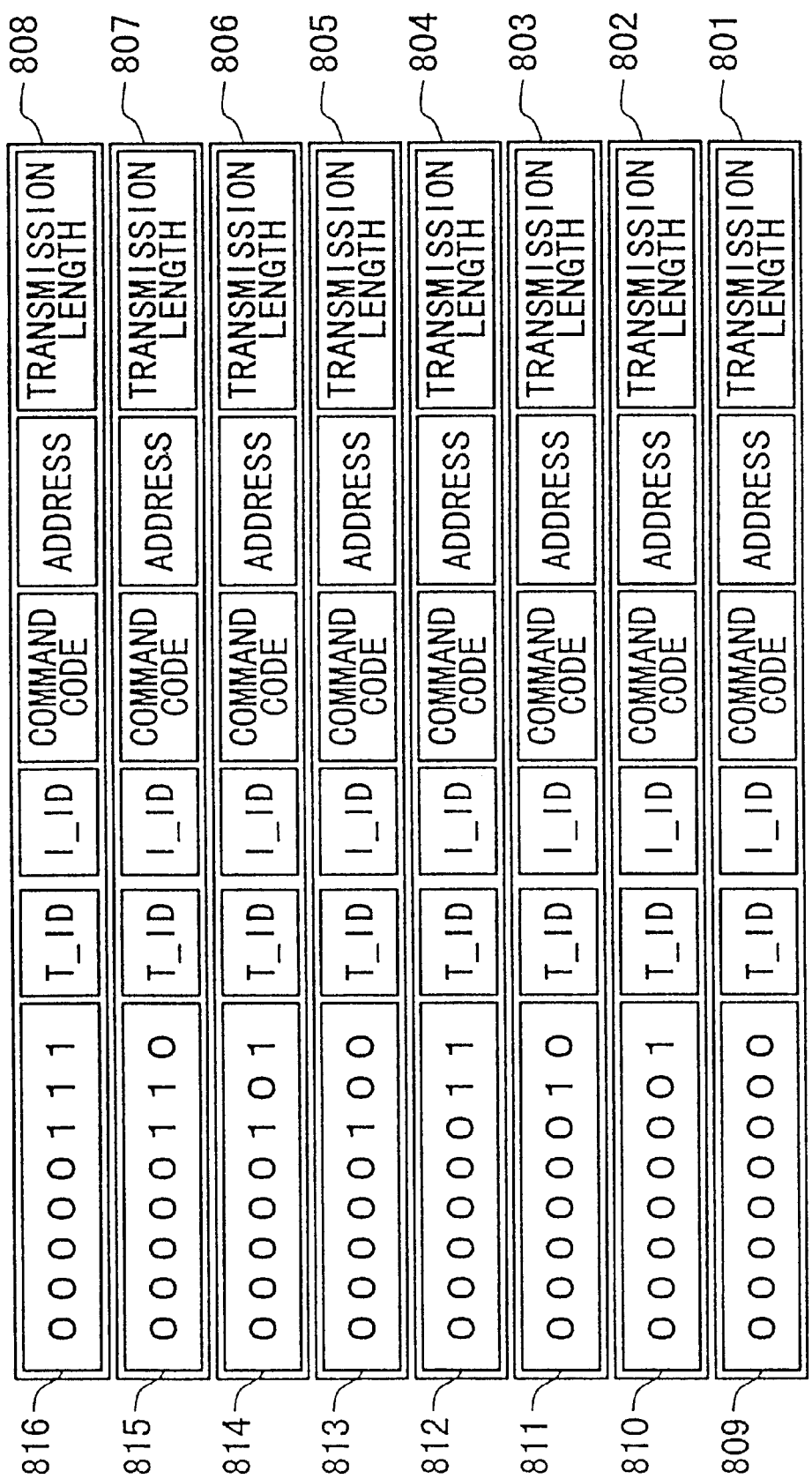

FIG. 9 shows the format of the I/O commands in a first conventional example.

Figure 10:
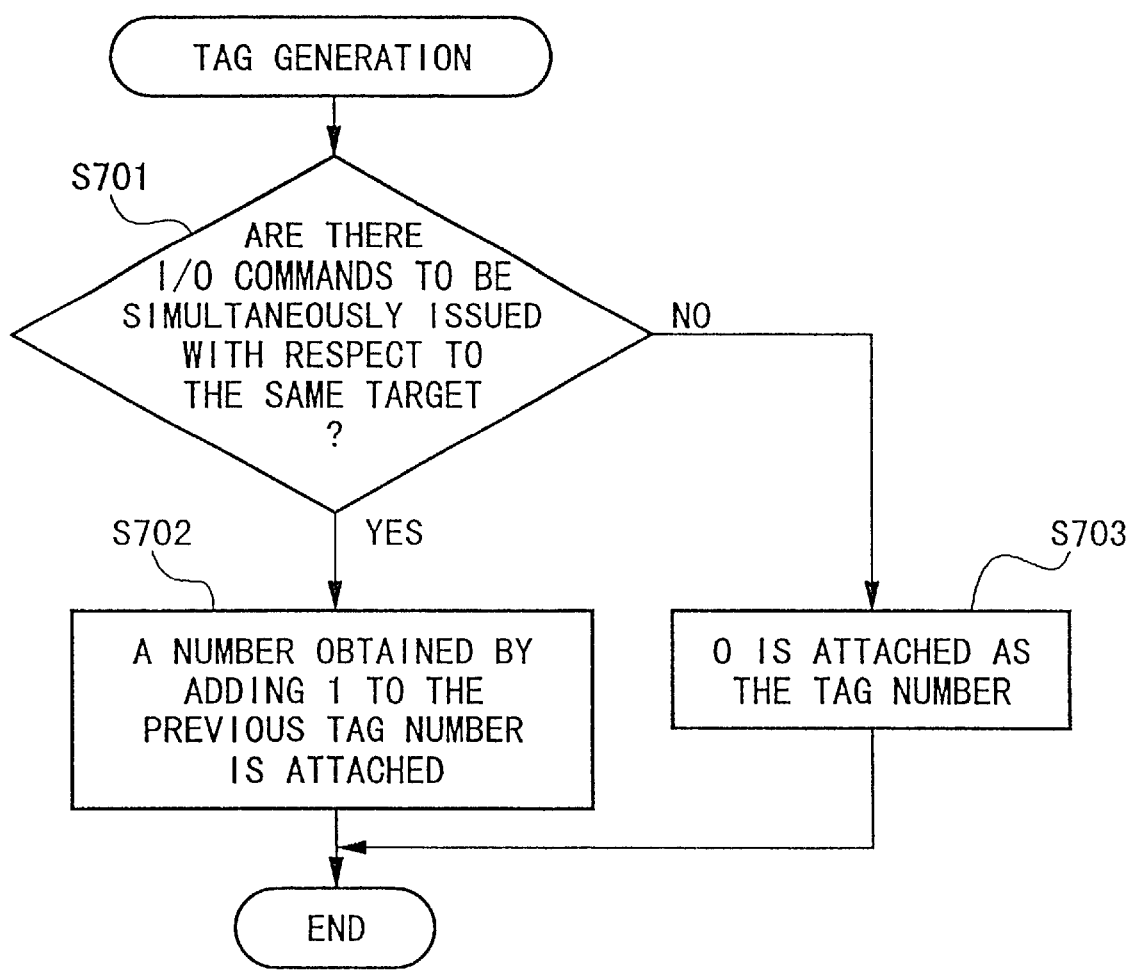

FIG. 10 is a flowchart showing the tag generation processing in the first conventional example.

Figure 11:
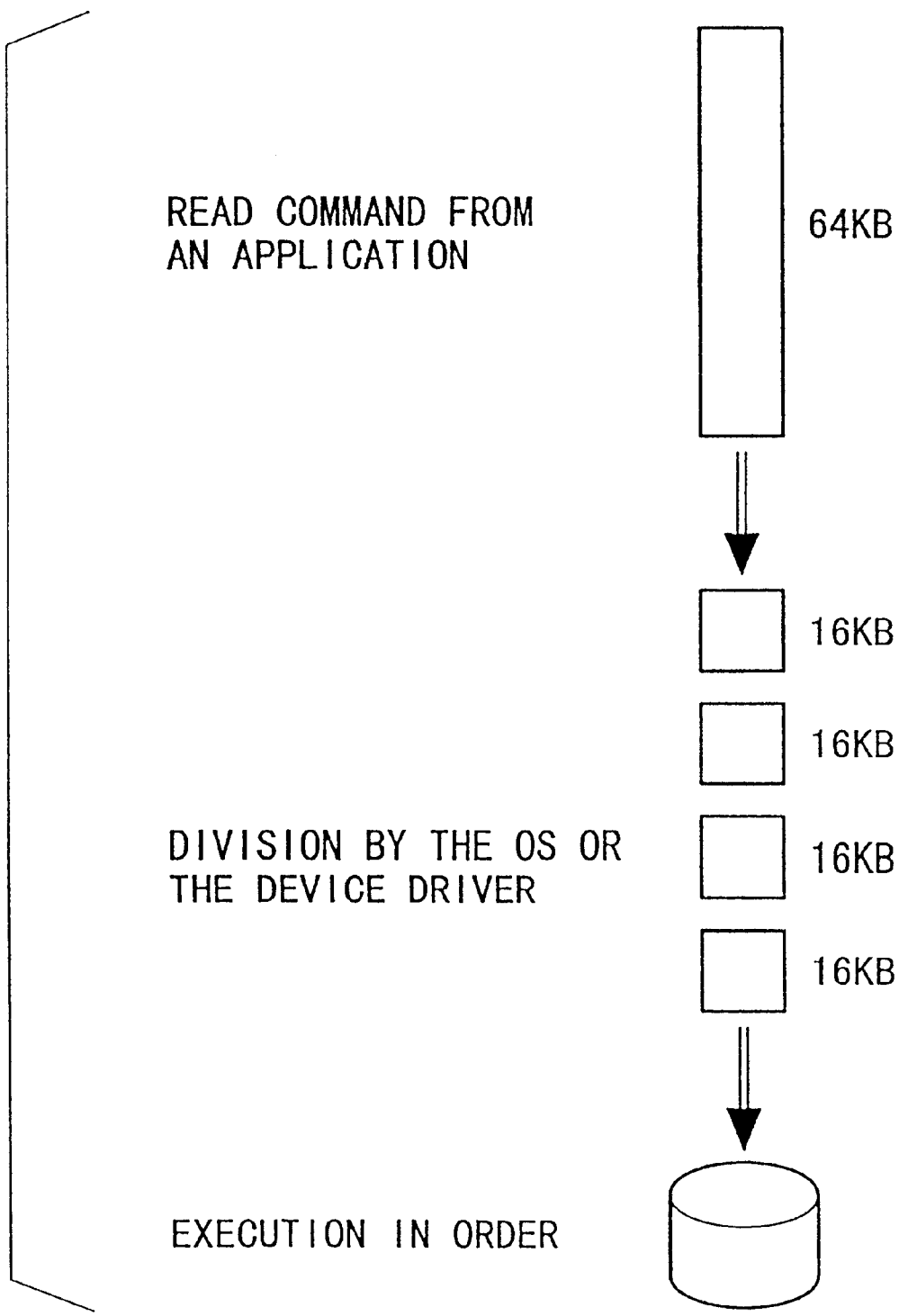

FIG. 11 shows the state of the issuance of I/O commands from the data processing device to the secondary storage device in the first conventional example.

Figure 12:
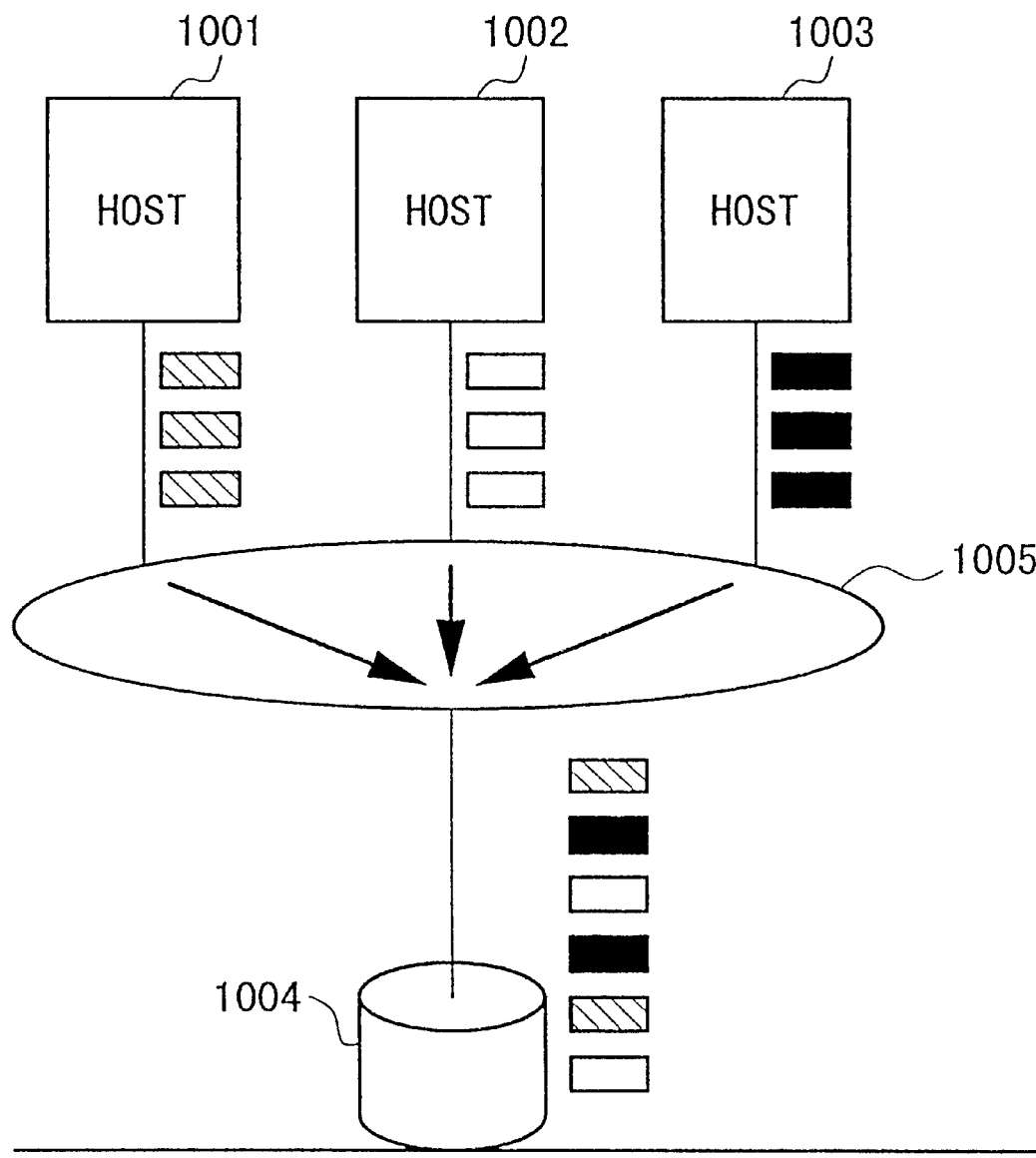

FIG. 12 serves to explain the seek operation when a plurality of data processing devices are connected to a single secondary storage device in the first conventional example.

Figure 13:
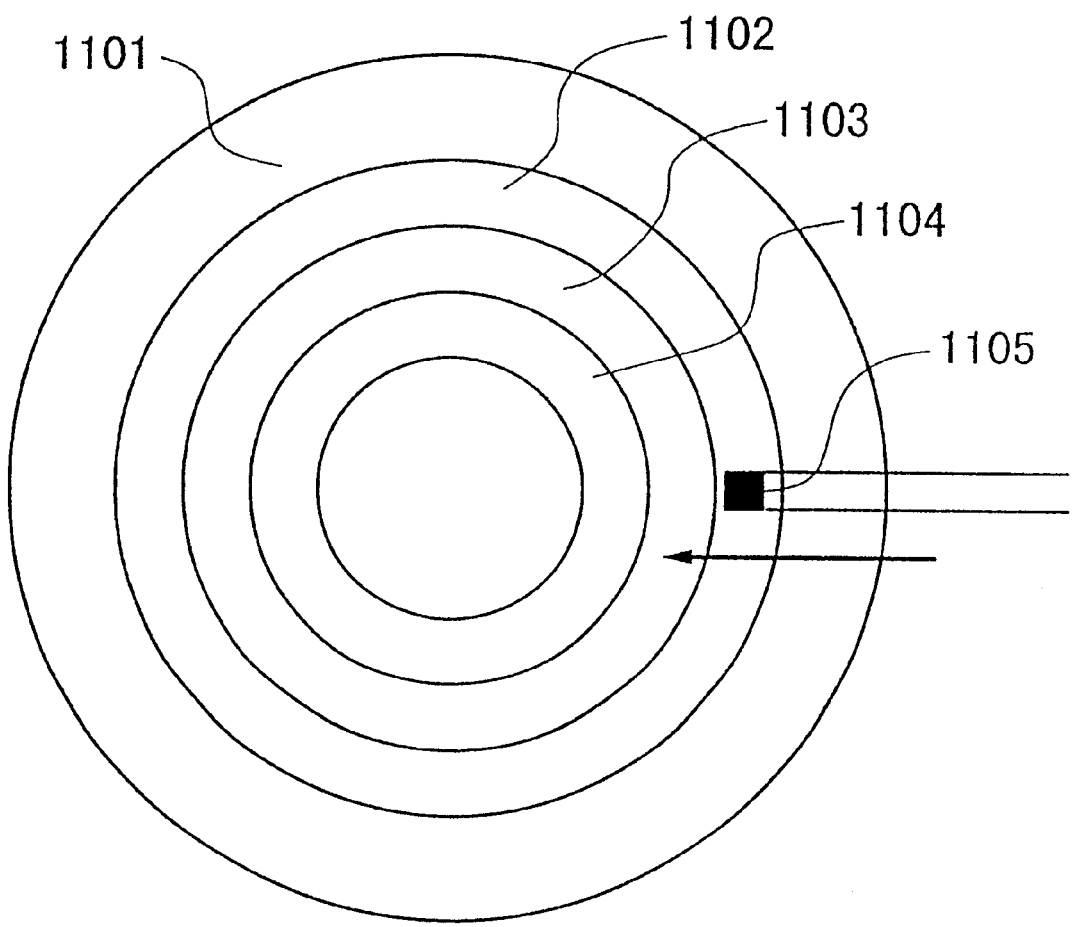

FIG. 13 serves to explain the elevator seek method.

FIG. 14 serves to explain the reordering operation of the I/O commands in a second conventional example.

DETAILED DESCRIPTION OF THE PREFERRED EMBODIMENTS

Hereinbelow, preferred embodiments of the present invention will be explained with referenced to the attached figures.

(First Preferred Embodiment)

Figure 1:
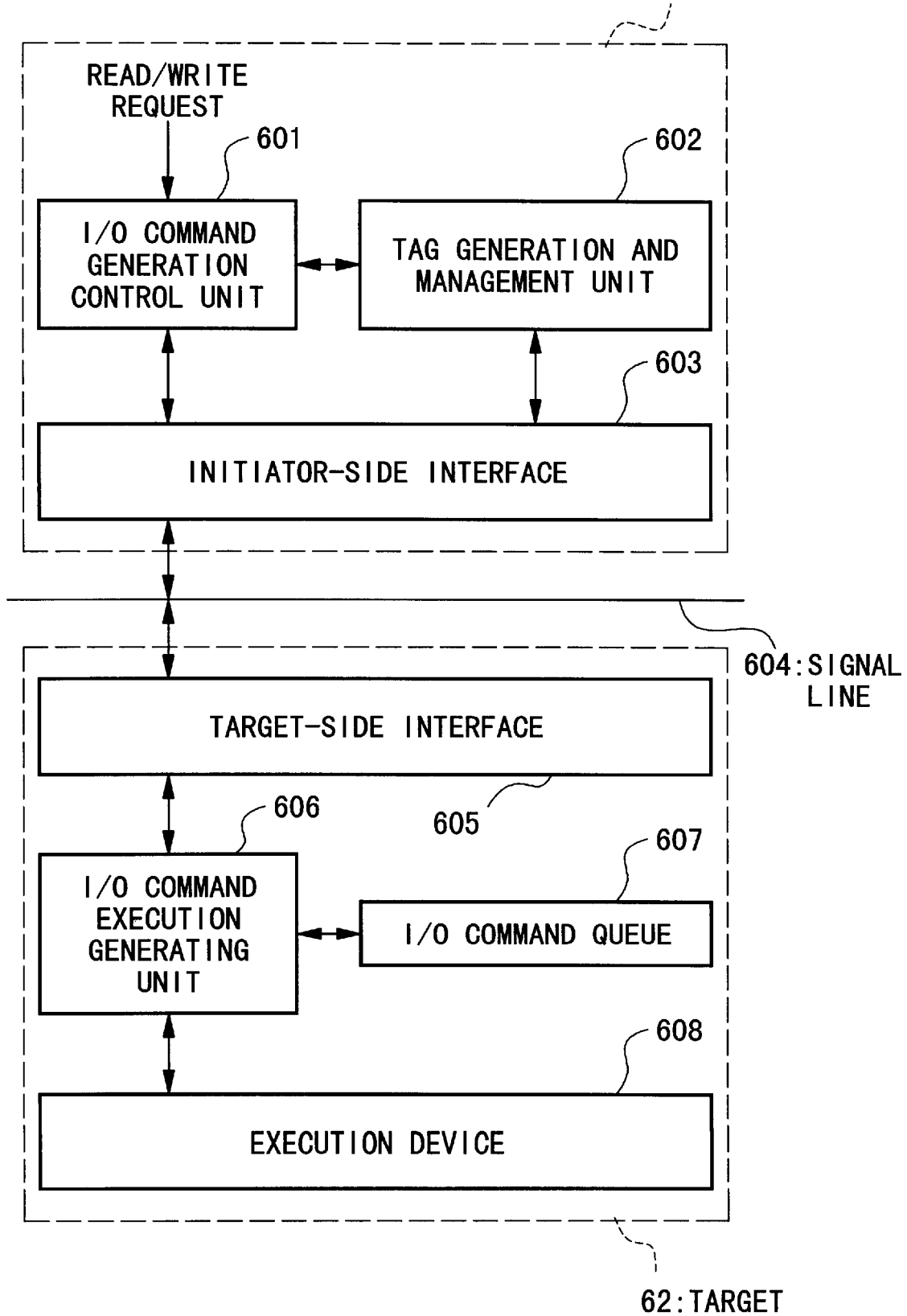
FIG. 1 is a block diagram showing the structure of a data processing system to which a first embodiment of the present invention has been applied.

FIG. 1 is a block diagram showing the structure of a data processing system to which this embodiment is applied. As shown in the figure, this data processing system comprises an initiator 61, comprising a host computer connected by means of signal lines 604 such as SCSI bus or the like, and a target 62 comprising a magnetic disk device; these exchange I/O commands with tags attached. In the figure, only one of each of initiator 61 and target 62 are depicted; however, a plurality thereof may exist.

Initiator 61 incorporates I/O command generation control unit 601, tag generation and management unit 602, and initiator-side interface 603. Target 62 contains target-side interface 605, I/O command execution generating unit 606, I/O command queue 607, and execution device 608.

I/O command generation control unit 601 comprises program-controlled processors, and this receives the read/write requests from an operating system or an application program on initiator 61, and generates I/O commands corresponding to these read/write requests. I/O command generation control unit 601 conducts an inquiry of tag generation and management unit 602 in order to attach tags when I/O commands are generated, and employs the tags attached in response to this inquiry as the tags of the I/O commands generated. The I/O command generation control unit 601 sends the I/O commands generated to the initiator-side interface 603.

The tag generation and management unit 602 comprises program-controlled processors, and in response to inquiries from I/O command generation control unit 601, attaches tags comprising a tag A part and a tag B part to the I/O commands to be issued.

Initiator-side interface 603 converts the I/O commands received from the I/O command generation control unit 601 to signals in conformance with SCSI or FC (Fibre Channel) or the like, and sends these to target 62 via signal line 604.

Target-side interface 605 converts the signals received from initiator 61 via signal line 604, extracts the I/O commands, and sends these to the I/O command execution generating unit 606.

I/O command execution generating unit 606 comprises processor-controlled processors, and this stores the I/O command received from the target-side interface 605 temporarily in I/O command queue 607, and extracts the I/O commands stored in the I/O command queue 607 in order from the first command, and sends these to execution device 608.

I/O command queue 607 is a storage device which stores the I/O commands received by I/O command execution generating unit 606. The readout of the I/O commands from I/O command queue 607 is conducted in order from those first stored; however, the readout of the I/O commands to the I/O command queue 607 may be done by insertion into the middle thereof, as well as by addition to the final end of the I/O commands stored.

Execution device 608 is a device which executes the I/O commands received from I/O command execution generating unit 606, and this conducts readout (read) of data from magnetic disks in accordance with the contents of the I/O commands received, or conducts writing (write) of data to the magnetic disk.

Figure 2:
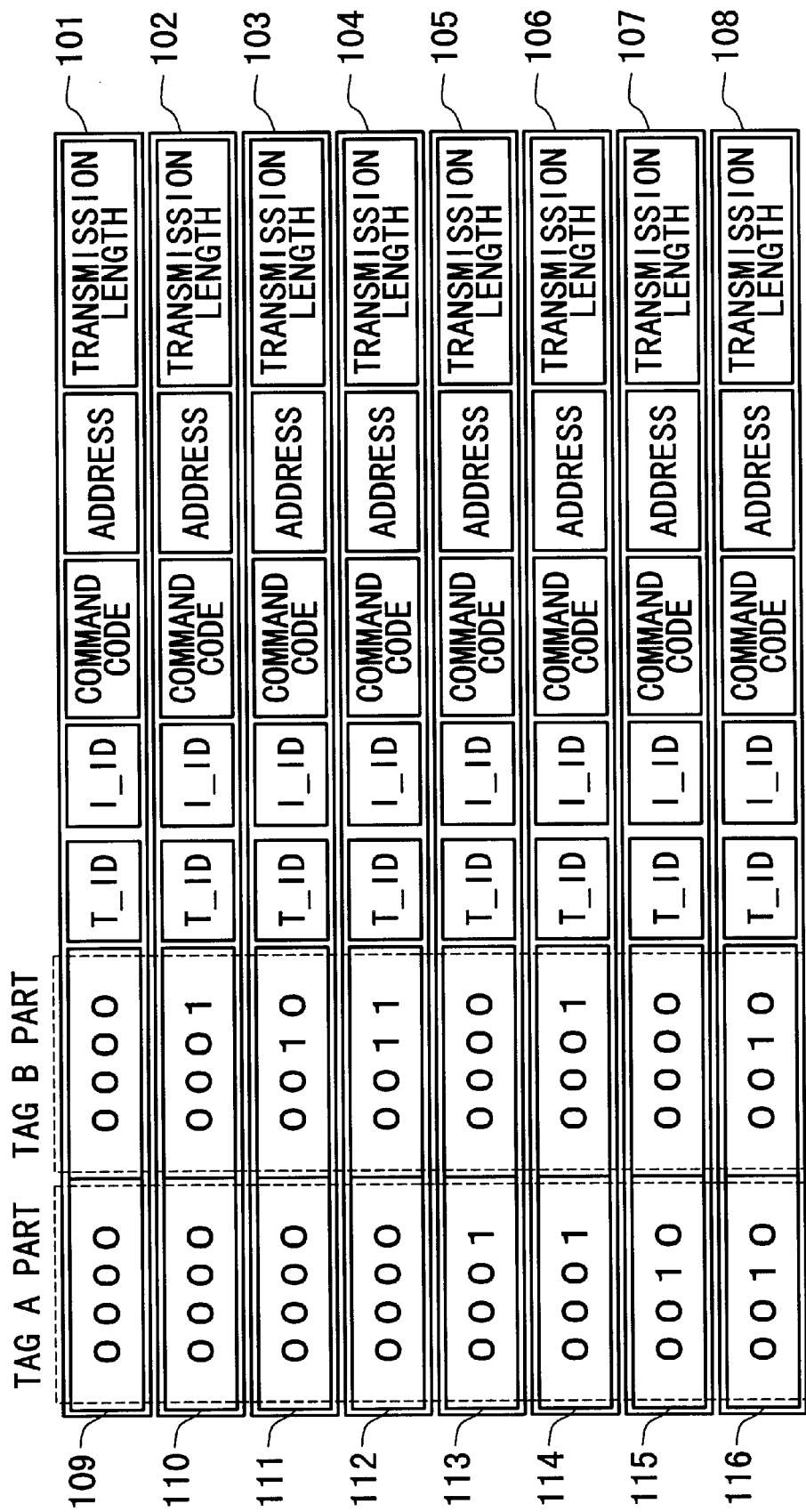
FIG. 2 shows the format of the I/O commands generated by the I/O command generation control unit in a first embodiment of the present invention.

FIG. 2 shows the format of the I/O commands generated by the I/O command generation control unit 601 of FIG. 1. As shown in the figure, each I/O command 101–108 includes, in addition to tags 109–116, a target number (T_ID), an initiator number (I_ID), a command code, an address, and a transmission length.

Tags 109–116 comprise a tag A part and a tag B part, respectively. In the tag A part, the same value is attached in a continuous I/O command group, which is to be executed in a continuous fashion. In the example shown in FIG. 2, I/O commands 101–104, I/O commands 105–106, and I/O commands 107–108 are I/O command groups which are to be continuously executed, respectively, and in these I/O command groups, the value of the tag A parts are, respectively, "0000", "0001", and "0010".

The tag B part serves to differentiate each I/O command in an I/O command group in which the value of the tag A part is identical; in I/O command groups, in which the value of the tag A part is identical, this provides a unique value for each I/O command. In the example shown in FIG. 2, in the I/O commands 101–104, the value of the tag A part is identical, at "0000", while the values of the tag B parts differ within a range of "0000"–"0011", respectively.

Furthermore, the target number indicates the number of the target 62 which is to execute the I/O command. The initiator number indicates the number of the initiator 61 which issued the I/O command. The command code is a code which indicates what type of operation is to be carried out in the execution device 608 of target 62; these are codes such as read, write, and the like. The address indicates the first of the data which are to be read or written, and the transmission length indicates the length of the data which are to be read or written.

Hereinbelow, the processing of this embodiment will be explained.

When I/O command generation control unit 601 receives a read or write request from the host application program, it generates one or more I/O commands sequentially. At this time, the I/O command generation control unit 601 generates one or more I/O commands sequentially. At this time, the I/O command generation control unit 601 makes an inquiry of the tag generation and management unit 602 with respect to each of the respective I/O commands to be generates, and generates tags therefor.

Figure 3:
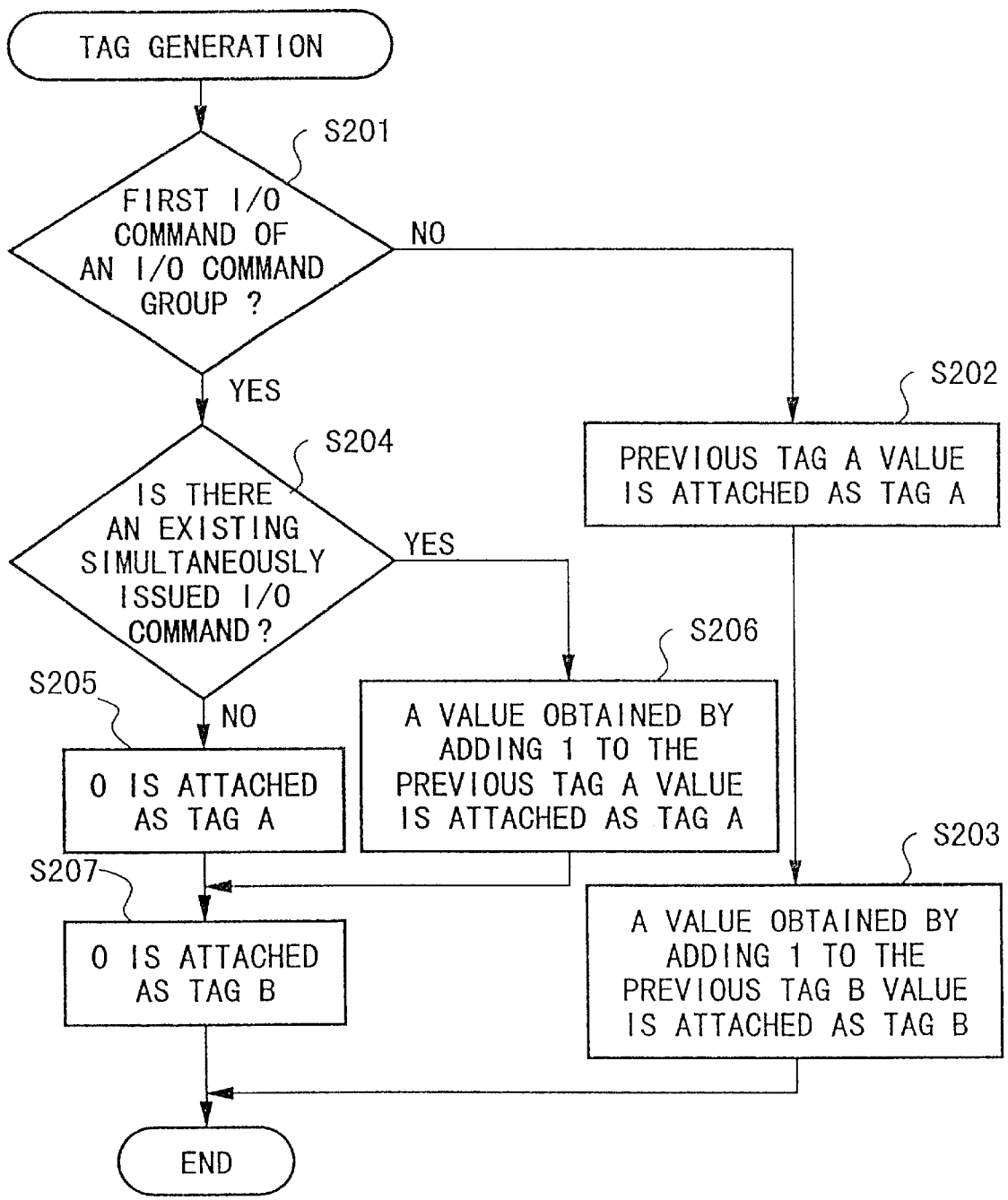
FIG. 3 is a flowchart showing the tag generation processing in the first embodiment of the present invention.

FIG. 3 is a flowchart showing the tag generation processing executed by the tag generation and management unit 602.

When processing is initiated, the tag generation and management unit 602 makes a determination as to whether the I/O command to be generated is the first I/O command within an I/O command group, in accordance with the inquiry from the I/O command generation control unit 601 (step S201).

When a determination has been made that the I/O command is not the first I/O command, the tag generation and management unit 602 attaches, as the tag A part value, a value equal to that immediately previously attached to the I/O command which is to be issued (step S202). Furthermore, tag generation and management unit 602 attaches to the I/O command which is to be issued, as the value of the tag B part, a value obtained by adding "1" to the value which was immediately previously attached (step S203). Then, the processing of the flowchart is terminated.

On the other hand, when a determination has been made that this is the first I/O command in step S201, then tag generation and management unit 602 makes a determination as to whether there are I/O commands which are to be simultaneously issued (step S204).

When a determination has been made that there are not already I/O commands which are simultaneously issued, the tag generation and management unit 602 attaches, to the I/O command which is to be issued, a value of "0" as the value of the tag A part (step S205), and proceeds to step S207. On the other hand, when a determination has been made that there are I/O commands which are to be simultaneously issued in step S204, then the tag generation and management unit 602 attaches to the I/O command which is to be issued, as the value of the tag A part, a value obtained by adding "1" to the value which was immediately previously attached (step S206), and proceeds to step S207. In step S207, the tag generation and management unit 602 attaches to the I/O command which is to be issued a value of "0" as the value of the tag B part, and the processing of the flowchart is then terminated.

Then, when as a result of inquiries the tag generation and management unit 602 has attached the tag A part and the tag B part, I/O command generation control unit 601 successively generates the I/O commands containing these tags, and successively sends these to the I/O command execution generating unit 606 of target 62, via initiator-side interface 603, signal line 604, and target-side interface 605.

When I/O command execution generating unit 606 receives I/O commands sent from the I/O command generation control unit 601 of initiator 61, it first stores these I/O commands received in the I/O command queue 607.

Figure 4:
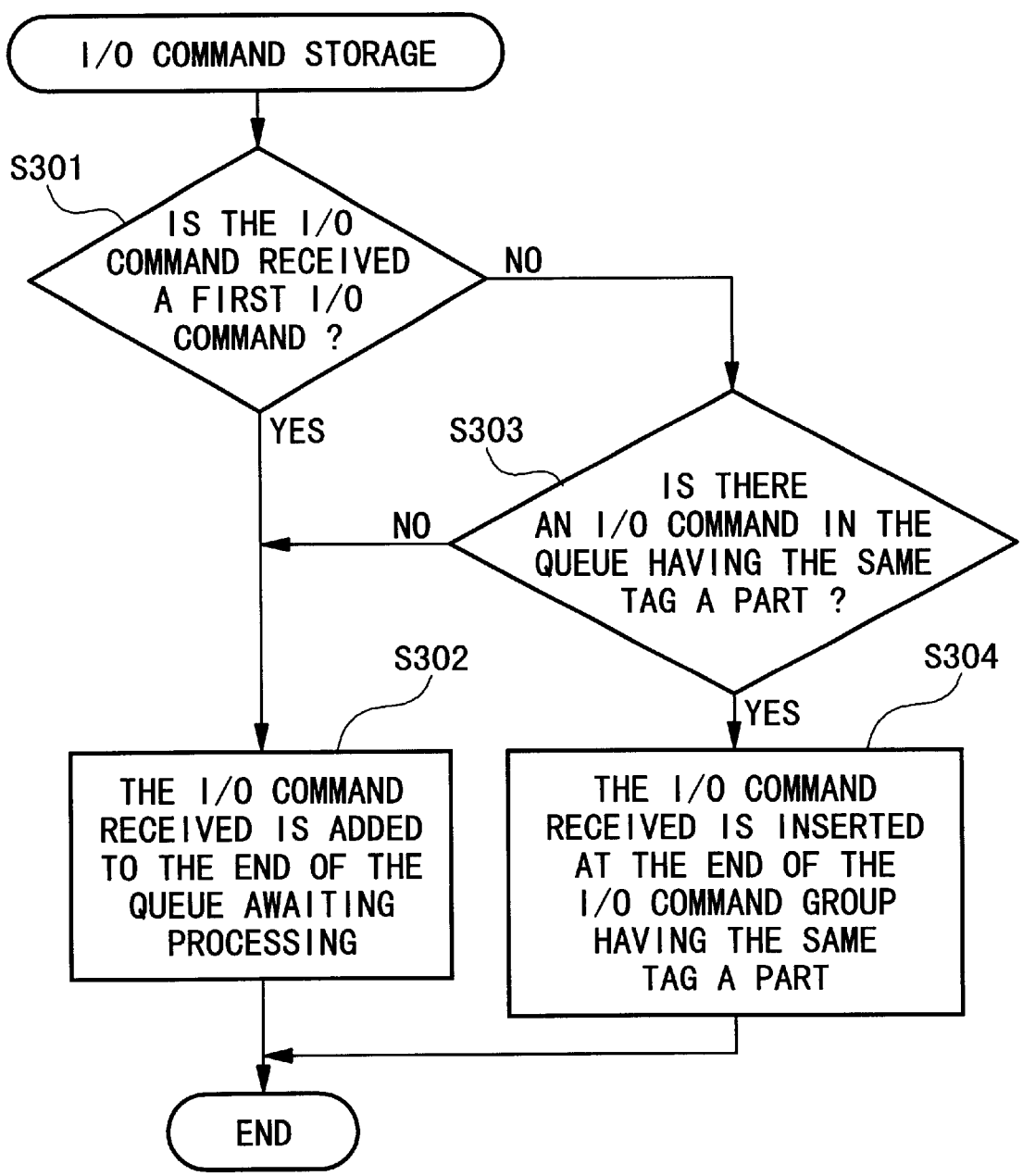
FIG. 4 is a flowchart showing the storage processing of the I/O commands in the I/O command queue in the first embodiment of the present invention.

FIG. 4 is a flowchart showing the storage processing of the I/O commands in the I/O command queue 607 which is executed by the I/O command execution generating unit 606 of FIG. 1.

When the processing is initiated, the I/O command execution generating unit 606 investigates whether the value of the tag B part of the I/O command received is "0", and thus determines whether this I/O command is the first I/O command of an I/O command group (step S301). When a determination has been made by the I/O command execution generating unit 606 that this is the first I/O command, the processing proceeds to the step S302 described hereinbelow.

On the other hand, when a determination has been made in step S301 that the I/O command is not the first I/O command, then I/O command execution generating unit 606 makes a determination as to whether an I/O command having a value of the tag A part which is identical to the value of the tag A part of this 110 command is already stored in the I/O command queue 607 (step S303). When a determination has been made that no I/O command having the same tag A part is stored, then processing proceeds to step S302. On the other hand, when a determination has been made that an I/O command having the same tag A part is stored, the processing proceeds to step S304.

In step S302, I/O command execution generating unit 606 appends the I/O command received to the final end of the I/O command queue 607. On the other hand, in step S304, the I/O command execution generating unit 606 inserts the I/O command received after the I/O command group having the same tag A part within the I/O command queue 607. Then, when the appending of the I/O command to the I/O command queue 607 in step S302 or S304 is ended, the processing of the flowchart is ended.

Furthermore, when the execution of the previous I/O command by the execution device 608 is completed, the I/O command execution generating unit 606 reads the I/O commands stored in I/O command queue 607 from the first command thereof, and transmits these to execution device 608. Then, execution device 608 executes the I/O commands transmitted.

As explained above, in the data processing system of this embodiment, a series of I/O commands which are issued in response to a read/write request in an application program are stored in a continuous fashion in an I/O command queue 607, and are executed in order. For this reason, for example, even in the case in which I/O commands from a plurality of initiators 61 reach the target 62, it is possible to efficiently execute the I/O commands without generating excessive search (seek) operations.

(Second Preferred Embodiment)

FIG. 5 is a block diagram showing the structure of a data processing system to which this embodiment has been applied. This data processing system differs from the data processing system of the first embodiment (FIG. 1); the I/O command generation control unit 601 generates the "surplus time" until the execution of an I/O command in target 63, and inserts this into the I/O command as described hereinbelow.

Furthermore, target 63 has a timer 609 which keeps track of the current time. Furthermore, when I/O command execution generating unit 606 receives an I/O command from the target-side interface 605, the current point in time as measured by the timer 609 is added to the "surplus time" in the I/O command received, and this is converted to a "deadline surplus time", and in accordance with this "deadline surplus time", the I/O command is stored in the I/O command queue 607.

FIG. 6 shows the format of the I/O commands generated by the I/O command generation control unit 601 of FIG. 5. Each I/O command 201–208 includes a tag 209–216 comprising a tag A part and a tag B part which are identical to those of the I/O commands of the first embodiment (FIG. 2), and additionally, contain "surplus time" after "transmission length". This "surplus time" is indicated in millisecond units by I/O command generation control unit 601, and this indicates the time at which the execution device 608 must execute the command from the reception of each I/O command by the I/O command execution generating unit 606 of target 63.

Hereinbelow, the processing in this embodiment will be explained.

In initiator 61, the generation processing of the tags which is executed by the tag generation and management unit 602 is identical to that in the first embodiment. However, in this embodiment, the I/O command generation control unit 601 attaches to surplus time to each I/O command. Additionally, the I/O commands to which the surplus time has been attached are transmitted from the I/O command generation control unit 601 to the I/O command execution generating unit 606, and the storage processing of the I/O commands in the I/O command queue 607 is conducted in the same way as in the first embodiment.

Figure 7:
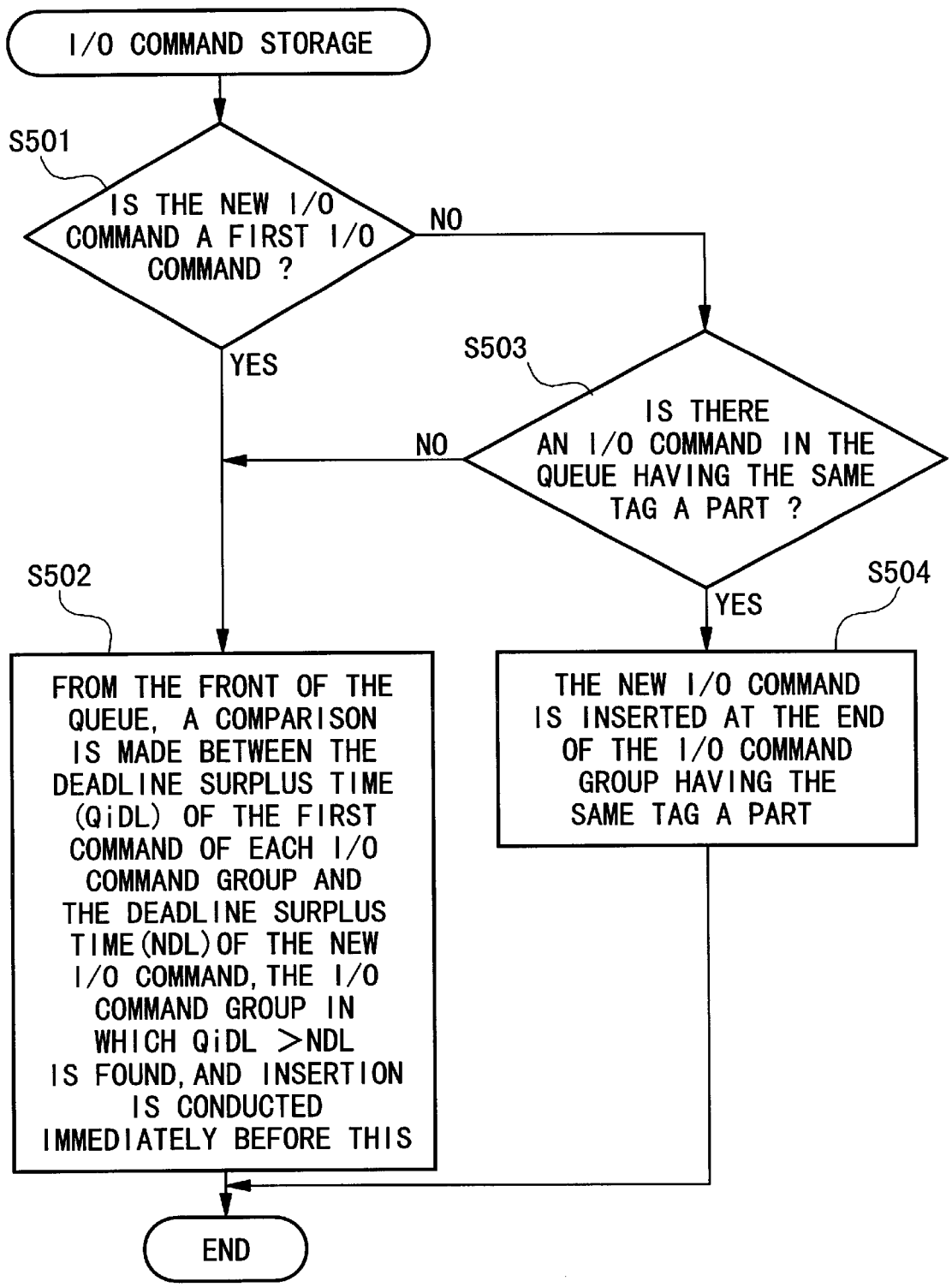
FIG. 7 is a flowchart showing the storage processing of the I/O commands in the I/O command queue in the second embodiment of the present invention.

FIG. 7 is a flowchart showing the storage processing of the I/O commands in the I/O command queue 607 which is executed by the I/O command execution generating unit 606 of FIG. 5. However, prior to the initiation of the processing of this flowchart, I/O command execution generating unit 606 completes the conversion of the "surplus time" to the "deadline surplus time".

When the processing is initiated, the I/O command execution generating unit 606 investigates whether the value of the tag B part of the I/O command received has a value of "0", and thus makes a determination as to whether this I/O command is the first I/O command of an I/O command group (step S501). Where a determination has been made that this is the first I/O command by the I/O command execution generating unit 606, processing proceeds to the step S502, which is discussed hereinbelow.

On the other hand, when a determination has been made that the I/O command is not the first I/O command in step S501, then I/O command execution generating unit 606 makes a determination as to whether an I/O command having the same tag A part as the value of the tag A part of this I/O command is stored in the I/O command queue 607 (step S503). When a determination has been made that no I/O command having the same tag A part is stored, processing proceeds to step S502. On the other hand, when a determination has been made that an I/O command having the same tag A part is stored, then processing proceeds to step S504.

In step S502, I/O command execution generating unit 606 compares the deadline surplus time (QiDL) of the first I/O command in each I/O command group stored in the I/O command queue 607 with the deadline surplus time (NDL) of the newly received I/O command, successively from the first one. Then, when an I/O command group has been discovered in which QiDL>NDL initially, the newly received I/O command is inserted immediately before the I/O command group within I/O command queue 607 (step S502). Then, the processing of the flowchart is ended.

In step S504, I/O command execution generating unit 606 inserts the newly received I/O command after the I/O command group having the same tag A part within the I/O command queue 607. Then, the processing of the flowchart is ended.

FIG. 8 shows the state in which the I/O command execution generating unit 606 has arranged the I/O commands received in the order received and stored them in the I/O command queue 607 as a result of the processing of the flowchart above. Here, the table in the upper part of the diagram indicates the order of arrival of the I/O commands, while the lower table indicates the order of storage of the I/O commands.

As can be seen from the figure, the I/O commands received by the I/O command execution generating unit 606 from the initiator 61 are first arranged by I/O command group, comprising I/O commands having the same value of the tag A part, and are next arranged by the order of the deadline surplus time within the I/O command groups and stored in the I/O command queue 607.

When the execution of the previous I/O command has been completed by the execution device 608, the I/O command execution generating unit 606 reads out the I/O commands stored in the I/O command queue 607 from the first command, and transfers these to the execution device 608. Next, the execution device 608 executes the I/O commands transferred.

As explained above, in accordance with the data processing system in accordance with this embodiment, the I/O commands contained within an I/O command group are executed consecutively, so that wasteful search (seek) operations are eliminated, and moreover, it is possible to conduct deadline control for each I/O command group.

(Variation)

The present invention is not limited to the first and second embodiments described above; a variety of modifications and applications are possible. Hereinbelow, modifications of the embodiments described above which may be applied to the present invention will be explained.

In the first and second embodiments described above, the tag generation and management unit 602 increases the value of the tag A part and the tag B part by a value of 1 (in steps S203 and S206); however, a decrease by a value of 1 is also possible. Alternatively, with respect to the tags, the values employed may be simultaneously written into a map, and reference may be made to this map and values which are not used may be found, and these may be attached to each I/O command as tags.

In the first and second embodiments described above, the I/O command execution generating unit 606 received an I/O command, and then initially investigated the tag thereof, and checked whether the I/O command was a first I/O command (steps S301 and S501). However, when the I/O command execution generating unit 606 receives an I/O command, the processing of steps S303 or S503 may be initially carried out without going through the processing of step S301 or S501.

In the second embodiment described above, the I/O command execution generating unit 606 added to the "surplus time" the time value of the timer 609 for conversion to the "deadline surplus time" with respect to all of the I/O commands received. However, when I/O commands having the same value of the tag A part are stored in the I/O command queue 607, it is possible to assign a deadline surplus time which is the same as the deadline surplus time of those I/O commands. By means of this, it becomes unnecessary for the I/O command execution generating unit 606 to investigate the I/O command groups within the I/O command queue 607, and a comparison of the "deadline surplus times" in the units of the I/O commands stored in the I/O command queue 607 may be conducted.

In the first and second embodiments described above, irrespective of the number of initiators 61, the values of the tag A parts were added to each I/O command in order from 0. However, the values of the tag A parts may be added by initiator number. For example, a value of the tag A part of "020000" may be added to the initial I/O command when the initiator number is "02".

In the first and second embodiments described above, a magnetic disk device was used as an example of the target 62. However, it is also possible to use other secondary storage devices as the target 62, and it is particularly effective to apply the present invention to secondary storage devices which involve seek operations. Furthermore, the secondary storage device need not be one which is capable of both reading and writing, as was the case with the magnetic disk device; a read-only secondary storage device may be employed.

In the first and second embodiments described above, the generation of the tags attached to the I/O commands to be issued is conducted by the tag generation and management unit 602 comprising program-controlled processes. In contrast, the program which serves to generate the tags attached to the I/O commands to be issued may be stored as a portion of the programming of, for example, the device driver, in computer-readable recording media such as a CD-ROM or a floppy disk or the like.

As described above, in accordance with the present invention, it is possible to efficiently execute a plurality of input and output commands.

What is claimed is:

1. A data processing system which is provided with a data processing device which issues input and output commands, and a secondary storage device which is connected to said data processing device via signal lines and which conducts data exchange with the data processing device in accordance with the input and output commands, wherein said data processing device comprises:
  a first tag attachment device for attaching a first tag which is identical with respect to a series of input and output commands for accessing a continuous region of said secondary storage device, among the input and output commands to be issued in response to input and output requests from a host, and which differs from other input and output commands simultaneously executed;
  a second tag attachment device for attaching a second tag for identifying respective input and output commands to which the same first tag is attached by means of said first tag attachment device;
  an input and output command generating device for generating input and output commands having first and second tags attached thereto by said first and second tag attachment devices; and
  an input and output command transmitter for transmitting input and output commands generated by said input and output command generating device to said secondary storage device via said signal lines; and
said secondary storage device comprising:
  an input and output command receiver for receiving input and output commands transmitted by said input and output command transmitter, via said signal lines;
  an input and output command storage device for storing input and output commands received by said input and output command receiver;
  an input and output command arrangement device for arranging input and output commands in accordance with said first and second tags attached to said input and output commands and storing the arranged input and output commands in said input and output command storage device; and
  an input and output command executing device for executing, in order, input and output commands arranged by said input and output command arrangement device and stored in said input and output command storage device.

2. A data processing system in accordance with claim 1, wherein said data processing device is further provided with a surplus time appending device for appending surplus time until the execution of said input and output command to each input and output command generated by said input and output command generating device, and
  said secondary storage device further comprises a timing device for timing points in time, and a deadline surplus time generating device for generating, based on surplus time appended to each input and output command received by said input and output command receiver and points in time measured by said timing device, a deadline surplus time which serves as the execution deadline for each input and output command, by means of said input and output command executing device, and
  said input and output command arrangement device further arranges said input and output commands in accordance with the deadline surplus time generated by said deadline surplus time generating device and stores the further arranged input and output commands in said input and output command storage device.

3. A data processing system in accordance with claim 2, further comprising a plurality of said data processing devices, and
  wherein said first tag attachment device of each data processing device attaches to the first tag identification data for identifying the plurality of data processing devices.

4. A data processing system in accordance with claim 1, further comprising a plurality of said data processing devices, and
  wherein said first tag attachment device of each data processing device attaches to the first tag identification data for identifying the plurality of data processing devices.

5. A data processing device connectable via signal lines with a secondary storage device and executing input and output commands in order in accordance with tags attached thereto, the data processing device comprising:
  a first tag attachment device for attaching a first tag which is identical with respect to a series of input and output commands for accessing a continuous region of said secondary storage device, among the input and output commands to be issued in response to input and output requests from a host, and which differs from other input and output commands simultaneously executed;
  a second tag attachment device for attaching a second tag for identifying respective input and output commands to which the same first tag is attached by means of said first tag attachment device;
  an input and output command generating device for generating input and output commands having first and second tags attached thereto by said first and second tag attachment devices; and
  an input and output command transmitter for transmitting input and output commands generated by said input and output command generating device to said secondary storage device via said signal lines.

6. A data processing device in accordance with claim 5, wherein said first tag attachment device attaches to the first tag identification data for identification with respect to other data processing devices.

7. A data processing device in accordance with claim 6, wherein said second tag attachment device attaches a second tag having a value corresponding to the order of issue of said input and output commands by said input and output command generating device.

8. A data processing device in accordance with claim 5, wherein said second tag attachment device attaches a second tag having a value corresponding to the order of issue of said input and output commands by said input and output command generating device.

9. A secondary storage device, comprising:
- an input and output command receiver for receiving input and output commands each having attached thereto a first tag which is identical with respect to a series of input and output commands accessing a continuous region and which differ from other input and output commands simultaneously executed, and a second tag for identification of input and output commands having an identical first tag;
- an input and output command storage device for respective input and output commands received by said input and output command receiver;
- an input and output command arrangement device for arranging said input and output commands in accordance with said first and second tags attached to said input and output commands, and storing arranged input and output commands in said input and output command storage device; and
- an input and output command execution device for executing, in order, input and output commands arranged by said input and output command arrangement device and stored in said input and output command storage device.

10. A secondary storage device in accordance with claim 9, wherein said input and output command arrangement device is provided with a device for determining whether an input and output command having a same first tag as an input and output command received by said input and output command receiver is stored in said input and output command storage device, and a device for storing the input and output command received by said input and output command receiver together with input and output commands having the same first tag previously stored in said input and output command storage device, when a determination has been made that an input and output command having the same first tag is stored.

11. A secondary storage device in accordance with claim 10, wherein said second tags appended to said input and output commands have values corresponding to an order of issue of said input and output commands by means of an input and output command issue device, and
- said input and output command arrangement device comprises a device for determining whether said input and output command is the first among a series of input and output commands to which the same first tags are appended, in accordance with said second tags, and a device for, when the device described above determines that this is a first input and output command, storing the input and output command received by said input and output command receiver at the final end of the input and output commands stored in the input and output command storage device.

12. A secondary storage device in accordance with claim 9, wherein said second tags appended to said input and output commands have values corresponding to an order of issue of said input and output commands by means of an input and output command issue device, and
- said input and output command arrangement device comprises a device for determining whether said input and output command is the first among a series of input and output commands to which the same first tags are appended, in accordance with said second tags, and a device for, when the device described above determines that this is a first input and output command, storing the input and output command received by said input and output command receiver at the final end of the input and output commands stored in the input and output command storage device.

13. A secondary storage device in accordance with claim 9, wherein surplus time until input and output commands received by said input and output command receiver are executed is added to said input and output commands,
- said secondary storage device further comprises a timing device for timing points in time, and a deadline surplus time generating device for generating, based on surplus time appended to each input and output command received by said input and output command receiver and points in time measured by said timing device, a deadline surplus time which serves as the execution deadline for each input and output command, by means of said input and output command executing device, and
- said input and output command arrangement device further arranges said input and output commands in accordance with the deadline surplus time generated by said deadline surplus time generating device and stores the further arranged input and output commands in said input and output command storage device.

14. A secondary storage device in accordance with claim 13, wherein said deadline surplus time generating device comprises a device for determining whether an input and output command having the same first tag as each input and output command received by said input and output command receiver is stored in said input and output command storage device, and a device for, when the device described above determines that an input and output command having the same first tag is stored, generating a deadline surplus time based on the deadline surplus time of each input and output command having the same first tag stored in said input and output command storage device.

15. A computer-readable recording medium which is programmed to cause a computing system to perform the following steps:
- a first tag attachment step for attaching a first tag which differs from other simultaneously executed input and output commands and which is identical with respect to a series of input and output commands which access a continuous region of a secondary storage device and are input and output commands which are to be issued in response to input and output requests from a host; and
- a second tag attachment step for attaching a second tag for identifying respective input and output commands to which the same first tag is attached in the first tag attachment step.

* * * * *